United States Patent
O'Connor et al.

(10) Patent No.: US 11,193,671 B2
(45) Date of Patent: Dec. 7, 2021

(54) FUEL OXYGEN CONVERSION UNIT WITH A FUEL GAS SEPARATOR

(71) Applicant: General Electric Company, Schenectady, NY (US)

(72) Inventors: Ethan Patrick O'Connor, Hamilton, OH (US); Daniel Alan Niergarth, Norwood, OH (US); Brandon Wayne Miller, Liberty Township, OH (US); Richard Alan Wesling, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 189 days.

(21) Appl. No.: 16/179,040

(22) Filed: Nov. 2, 2018

(65) Prior Publication Data

US 2020/0141575 A1    May 7, 2020

(51) Int. Cl.
*F23K 5/08*         (2006.01)
*B01D 19/00*        (2006.01)
(Continued)

(52) U.S. Cl.
CPC ............ *F23K 5/08* (2013.01); *B01D 19/0005* (2013.01); *B64D 37/34* (2013.01); *F02C 7/224* (2013.01);
(Continued)

(58) Field of Classification Search
CPC ............... B01D 3/343; B01D 19/0005; B01D 19/0063; B01D 45/14; B01D 2257/104;
(Continued)

(56) References Cited

U.S. PATENT DOCUMENTS 2,379,133 A * 6/1945 Curtis .................... F04D 9/002
                                                    96/217
2,575,568 A * 11/1951 Topanelian, Jr. ........ F02M 1/00
                                                    96/217
(Continued)

FOREIGN PATENT DOCUMENTS

EP        2003311 A2    12/2008
EP        3018304 A1    5/2016
(Continued)

OTHER PUBLICATIONS

U.S. Appl. No. 15/819,327, filed Nov. 28, 2017.
(Continued)

*Primary Examiner* — Scott J Walthour
(74) *Attorney, Agent, or Firm* — Dority & Manning, P.A.

(57) ABSTRACT

A fuel oxygen conversion unit includes a contactor defining a liquid fuel inlet, a stripping gas inlet and a fuel/gas mixture outlet; and a fuel gas separator defining a fuel/gas mixture inlet in flow communication with the fuel/gas mixture outlet of the contactor and an axis. The fuel gas separator further includes a stationary casing; and a separator assembly including a core and a plurality of paddles extending from the core, the separator assembly rotatable about the axis within the stationary casing to separate a fuel/gas mixture received through the fuel/gas mixture inlet into a liquid fuel flow and stripping gas flow.

18 Claims, 6 Drawing Sheets

(51) Int. Cl.
*F02C 7/224* (2006.01)
*F23K 5/04* (2006.01)
*B64D 37/34* (2006.01)
*F23K 5/14* (2006.01)

(52) U.S. Cl.
CPC .............. *F23K 5/04* (2013.01); *F23K 5/142* (2013.01); *F05D 2260/213* (2013.01); *F05D 2260/53* (2013.01); *F23K 2300/10* (2020.05)

(58) Field of Classification Search
CPC ... B64D 37/34; F01M 2013/0422; F02C 3/20; F02C 7/22; F02C 7/222; F02C 7/224; F02C 7/236; F02M 37/22; F04D 31/00; F05D 2260/213; F05D 2260/53; F23K 5/04; F23K 5/08; F23K 5/10; F23K 5/142; F23K 5/18; F23K 2300/10; F23K 2300/103; F23K 2300/204; F23K 2900/05082; F23R 2900/00004
See application file for complete search history.

(56) References Cited

U.S. PATENT DOCUMENTS

| | | |
|---|---|---|
| 2,582,842 A | 1/1952 | Messinger |
| 2,720,313 A | 10/1955 | Pattison |
| 2,893,628 A | 7/1959 | Herman |
| 3,050,240 A | 8/1962 | Darnell |
| 3,178,105 A | 4/1965 | Darnell |
| 3,590,559 A | 7/1971 | Bragg |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 5,149,018 A | 9/1992 | Clark |
| 5,267,608 A | 12/1993 | Coffinberry |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,134,876 A | 10/2000 | Hines et al. |
| 6,182,435 B1 | 2/2001 | Niggemann et al. |
| 6,250,097 B1 | 6/2001 | Lui et al. |
| 6,294,091 B1 | 9/2001 | Hoff |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-Wlam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams |
| 9,885,290 B2 | 2/2018 | Della-Fera et al. |
| 9,897,054 B2 | 2/2018 | Lo et al. |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0262309 A1 | 10/2011 | Limaye et al. |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1 | 6/2016 | Lo et al. |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |

(56) References Cited

U.S. PATENT DOCUMENTS

| | | |
|---|---|---|
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0291714 A1 | 10/2017 | Corman |
| 2017/0326488 A1* | 11/2017 | Kawamoto ............ F04B 53/06 |
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2020/0086239 A1 | 3/2020 | Cordatos et al. |

FOREIGN PATENT DOCUMENTS

| | | |
|---|---|---|
| EP | 3075957 A1 | 10/2016 |
| EP | 3623030 A1 | 3/2020 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |

OTHER PUBLICATIONS

U.S. Appl. No. 15/819,443, filed Nov. 21, 2017.
Landfill, Sewage, Biogas, Coal, Seam & Mines Gas Separation/Filtration, Kelburn Engineering—LandfillGas and Air Separation, 3 pages. www.kelburneng.com.uk/landfill-gas-bio-gas-sewer-gas.php.

\* cited by examiner

FUEL OXYGEN CONVERSION UNIT WITH A FUEL GAS SEPARATOR

FIELD

The present subject matter relates generally to a fuel oxygen conversion unit for an engine, and more particularly to a fuel oxygen conversion unit with a fuel gas separator.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen conversion systems have been proposed for such a purpose.

Certain fuel oxygen conversion systems mix fuel with a relatively low oxygen content stripping gas. However, the inventors of the present disclosure have found that a substantially high amount of the stripping gas must be removed from the fuel after mixing to limit undesirable results, such as combustion dynamics. Accordingly, a fuel oxygen conversion unit with a fuel gas separator capable of removing a desired amount of stripping gas would be useful.

BRIEF DESCRIPTION

Aspects and advantages of the invention will be set forth in part in the following description, or may be obvious from the description, or may be learned through practice of the invention.

In one exemplary embodiment of the present disclosure, a fuel oxygen conversion unit is provided. The fuel oxygen conversion unit includes a contactor defining a liquid fuel inlet, a stripping gas inlet and a fuel/gas mixture outlet; and a fuel gas separator defining a fuel/gas mixture inlet in flow communication with the fuel/gas mixture outlet of the contactor and an axis. The fuel gas separator further includes a stationary casing; and a separator assembly including a core and a plurality of paddles extending from the core, the separator assembly rotatable about the axis within the stationary casing to separate a fuel/gas mixture received through the fuel/gas mixture inlet into a liquid fuel flow and stripping gas flow.

In certain exemplary embodiments the core of the separator assembly is a gas permeable core extending generally along the axis of the fuel gas separator.

In certain exemplary embodiments the core of the separator assembly includes a gas permeable boundary, wherein the gas permeable boundary defines a filter radius and a filter length along the axis, and wherein the filter radius of the gas permeable boundary is substantially constant substantially along the filter length.

In certain exemplary embodiments the fuel gas separator extends between a first end and a second end generally along the axis, wherein the fuel/gas mixture inlet is positioned proximate the first end, wherein the liquid fuel outlet is positioned proximate the second end, and wherein the stationary casing defines an inner surface that diverges away from the axis towards the second end.

In certain exemplary embodiments the fuel gas separator further defines a radial direction relative the axis and a liquid fuel outlet, wherein the fuel/gas mixture inlet of the fuel gas separator defines an inlet radius along the radial direction relative to the axis, wherein the liquid fuel outlet of the fuel gas separator defines an outlet radius along the radial direction relative to the axis, and wherein the outlet radius is greater than the inlet radius.

In certain exemplary embodiments the fuel gas separator further defines a circumferential direction extending about the axis, and wherein the plurality of paddles of the separator assembly extend outwardly from the core and are spaced along the circumferential direction.

In certain exemplary embodiments the fuel gas separator further defines a radial direction relative to the axis, wherein the plurality of paddles each define a length along the axis and a clearance with the stationary casing, and wherein the clearance of each of the plurality of paddles is substantially constant along their respective lengths.

In certain exemplary embodiments the fuel gas separator further defines a radial direction relative the axis, and wherein the plurality of paddles defines a sweep angle relative to the radial direction greater than 0.

For example, in certain exemplary embodiments the sweep angle is greater than about 10 degrees and less than about 45 degrees.

For example, in certain exemplary embodiments the sweep angle is greater than about 15 degrees and less than about 30 degrees.

For example, in certain exemplary embodiments the separator assembly is configured to rotate in a first circumferential direction about the axis during operation, and wherein each of the plurality of paddles slopes away from the core and in a direction opposite the first circumferential direction.

In certain exemplary embodiments the fuel gas separator defines a stripping gas outlet and extends between a first end and a second end generally along the axis, wherein the fuel/gas mixture inlet is positioned proximate the first end, and wherein the stripping gas outlet is also positioned proximate the first end.

In certain exemplary embodiments the fuel gas separator further defines a liquid fuel outlet, a first end, and a second end, wherein the liquid fuel outlet is positioned proximate the second end, and wherein the stationary casing defines an inner surface that converges towards the axis towards the second end.

For example, in certain exemplary embodiments the inner surface of the stationary casing is a first section of the inner surface of the stationary casing positioned proximate the first end of the fuel gas separator, wherein the stationary casing further defines a second section of the inner surface of the stationary casing positioned proximate the second end of the fuel gas separator, and wherein the second section of the inner surface of the stationary casing diverges away from the axis towards the second end.

For example, in certain other exemplary embodiments each of the plurality of paddles are configured as continuous, single piece paddles extending from a location within the first section of the inner surface of the stationary casing along the axial direction to a location within the second section of the inner surface of the stationary casing.

For example, in certain other exemplary embodiments the fuel gas separator further defines a radial direction relative to the axis, wherein the plurality of paddles define a clearance with the first section of the inner surface of the stationary casing and with the second section of the inner surface of the stationary casing, and wherein the clearance of each of the plurality of paddles is substantially constant within the first section and within the second section.

In certain exemplary embodiments the fuel oxygen conversion unit further includes a gas oxygen reduction unit, wherein the fuel oxygen conversion unit defines a circulation gas path extending from a stripping gas outlet of the fuel gas separator to the stripping gas inlet of the contactor, and wherein the gas oxygen reduction unit is positioned in flow communication with the circulation gas path.

For example, in certain exemplary embodiments the fuel oxygen conversion unit further includes a gas boost pump positioned in flow communication with the circulation gas path.

In another exemplary embodiment of the present disclosure, a gas turbine engine is provided. The gas turbine engine includes a combustion section; and a fuel delivery system for providing a flow of fuel to the combustion section, the fuel delivery system including a fuel oxygen conversion unit. The fuel oxygen conversion unit includes a contactor defining a liquid fuel inlet, a stripping gas inlet and a fuel/gas mixture outlet; and a fuel gas separator defining a fuel/gas mixture inlet in flow communication with the fuel/gas mixture outlet of the contactor and an axis. The fuel gas separator includes a stationary casing; and a separator assembly including a core and a plurality of paddles extending from the core, the separator assembly rotatable about the axis within the stationary casing to separate a fuel/gas mixture received through the fuel/gas mixture inlet into a liquid fuel flow and stripping gas flow.

In certain exemplary embodiments the fuel gas separator extends between a first end and a second end generally along the axis, wherein the fuel/gas mixture inlet is positioned proximate the first end, wherein the liquid fuel outlet is positioned proximate the second end, and wherein the stationary casing defines an inner surface that diverges away from the axis towards the second end.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
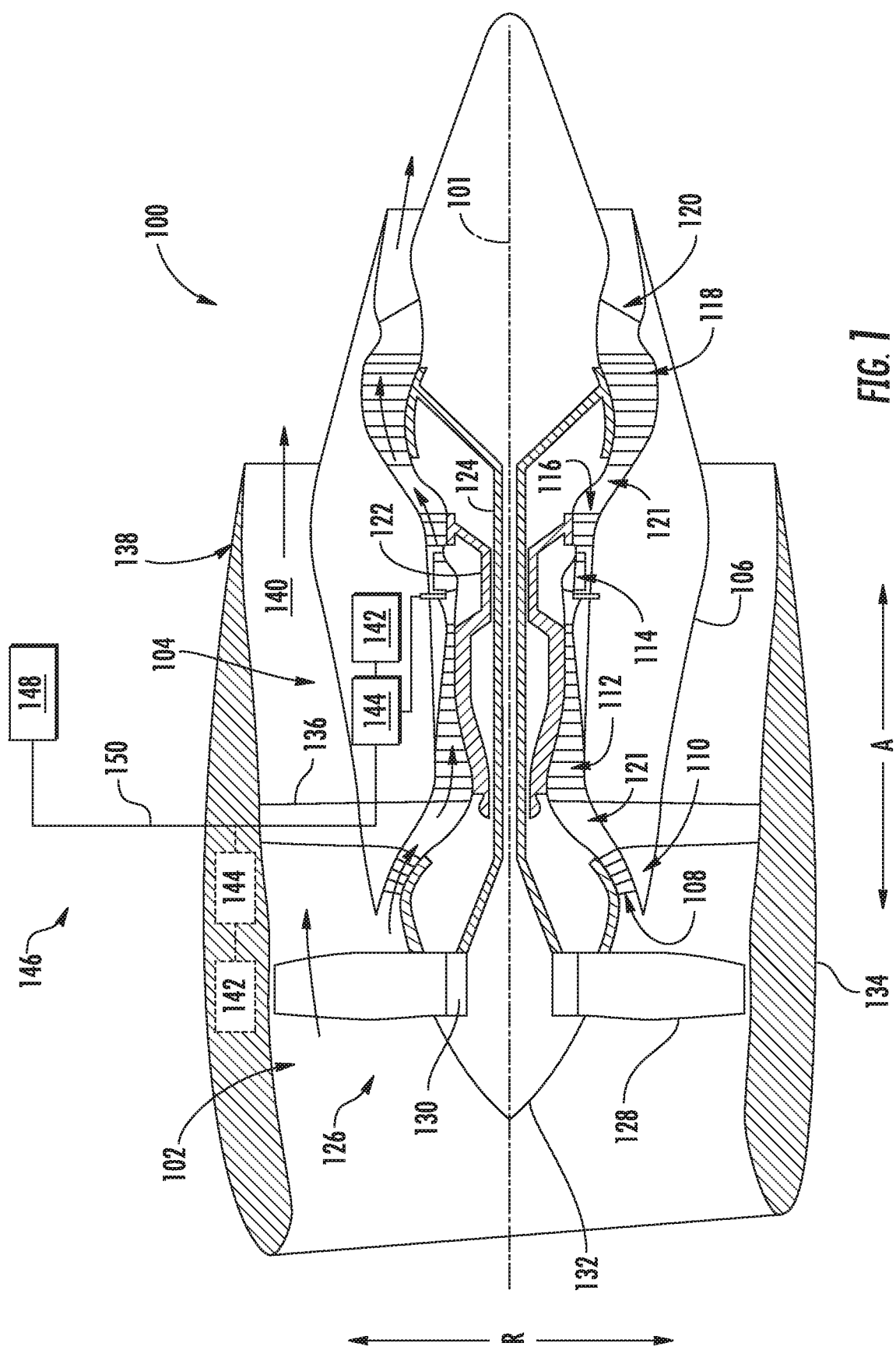
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft or vehicle.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen conversion unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen conversion unit 144 is coupled to, or otherwise rotatable with, the accessory gearbox 142. In such a manner, it will be appreciated that the exemplary fuel oxygen conversion unit 144 is driven by the accessory gearbox 142. Notably, as used herein, the term "fuel oxygen conversion unit" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100. A more detailed schematic of a fuel delivery system in accordance with an exemplary embodiment of the present disclosure is provided below with reference to FIG. 2.

Moreover, it will be appreciated that although for the embodiment depicted, the turbofan engine 100 includes the accessory gearbox 142 and fuel oxygen conversion unit 144 positioned within the turbomachine 104, i.e., within the casing 106 of the turbomachine 104, in other embodiments, the accessory gearbox 142 and/or fuel oxygen conversion unit 144 may be positioned at any other suitable location. For example, as is depicted in phantom in FIG. 1, in other embodiments, the accessory gearbox 142 and/or the fuel oxygen conversion unit 144 may be positioned within the nacelle 134 of the turbofan engine 100. Alternatively, in still other embodiments, the accessory gearbox 142 may be positioned with the turbofan engine 100 and the fuel oxygen conversion unit 144 may be positioned remote from the turbofan engine 100, such as proximate to, or within, the tank 148 of the fuel delivery system 146. Additionally, in other embodiments, the fuel oxygen conversion unit 144 may additionally or alternatively be driven by other suitable power sources such as an electric motor, a hydraulic motor, or an independent mechanical coupling to the HP or LP shaft, etc. For example, when the accessory gearbox 142 is driven by an electric motor, the electric motor may be configured to receive electrical power from an electric machine/generator being driven by the engine, such as an LP or HP system of the engine.

Moreover, it will be appreciated that although for the embodiment depicted, the turbofan engine 100 includes the fuel oxygen conversion unit 144 positioned within the turbomachine 104, i.e., within the casing 106 of the turbomachine 104, in other embodiments, the fuel oxygen conversion unit 144 may be positioned at any other suitable location. For example, in other embodiments, the fuel oxygen conversion unit 144 may instead be positioned remote from the turbofan engine 100. Additionally, in other embodiments, the fuel oxygen conversion unit 144 may additionally or alternatively be driven by other suitable power sources such as an electric motor, a hydraulic motor, or an independent mechanical coupling to the HP or LP shaft, etc.

Figure 2:
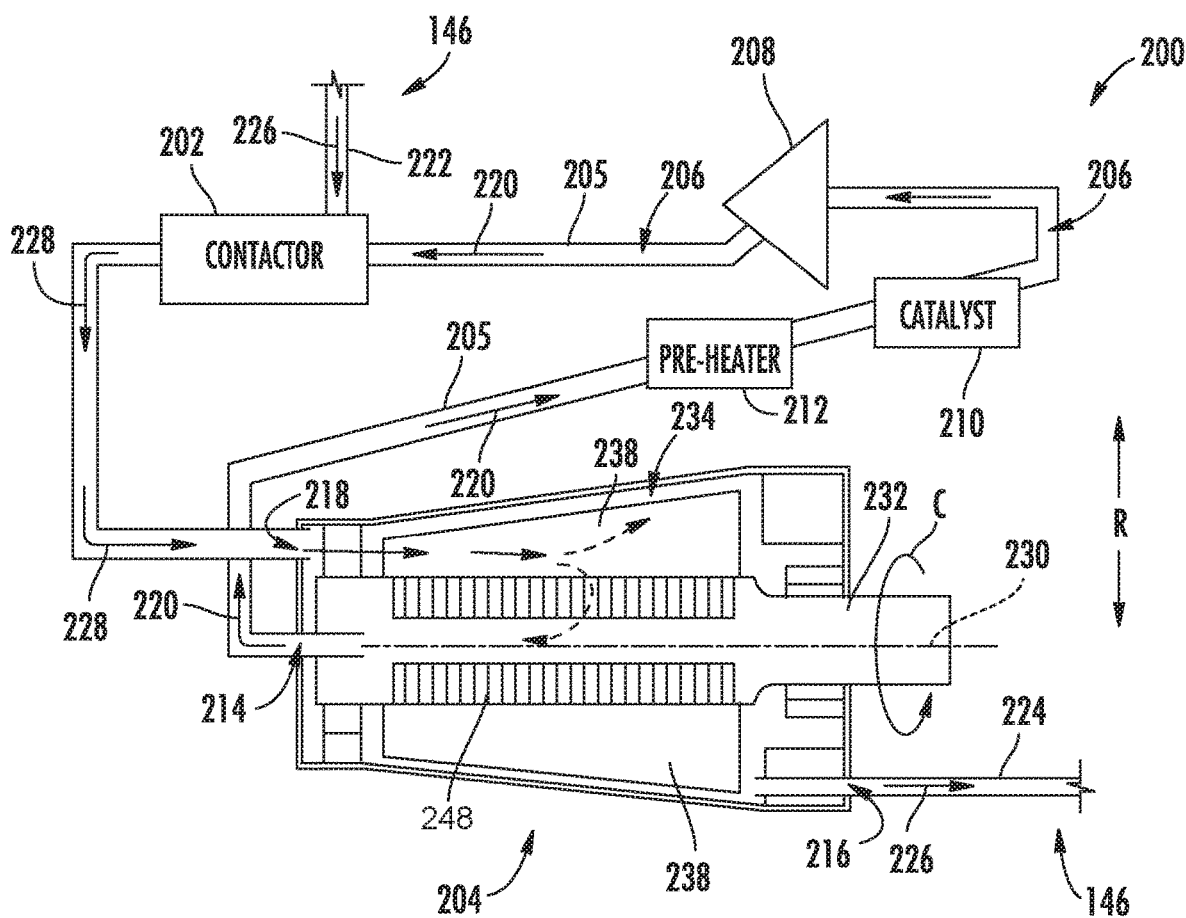
FIG. 2 is a schematic view of a fuel oxygen conversion unit in accordance with an exemplary embodiment of the present disclosure.

Referring now to FIG. 2, a schematic drawing of a fuel oxygen conversion unit 200 for a gas turbine engine in accordance with an exemplary aspect of the present disclosure is provided. In at least certain exemplary embodiments, the exemplary fuel oxygen conversion unit 200 depicted in FIG. 2 may be incorporated into, e.g., the exemplary engine 100 described above with reference to FIG. 1 (e.g., may be the fuel oxygen conversion unit 144 depicted in FIG. 1 and described above).

As will be appreciated from the discussion herein, the fuel oxygen conversion unit 200 of FIG. 2 generally includes a contactor 202 and a fuel gas separator 204. The exemplary contactor 202 depicted may be configured in any suitable manner to substantially mix a received gas and liquid flow, as will be described below. For example, the contactor 202 may, in certain embodiments be a mechanically driven contactor (e.g., having paddles for mixing the received flows), or alternatively may be a passive contactor for mixing the received flows using, at least in part, a pressure and/or flowrate of the received flows.

Moreover, the exemplary fuel oxygen conversion unit 200 includes a stripping gas line 205, and more particularly, includes a plurality of stripping gas lines 205, which together at least in part define a circulation gas flowpath 206 extending from the fuel gas separator 204 to the contactor 202. In certain exemplary embodiments, the circulation gas flowpath 206 may be formed of any combination of one or more conduits, tubes, pipes, etc. in addition to the plurality stripping gas lines 205 and structures or components within the circulation gas flowpath 206.

As will be explained in greater detail, below, the fuel oxygen conversion unit 200 generally provides for a flow of stripping gas 220 through the plurality of stripping gas lines 205 and stripping gas flowpath 206 during operation. It will be appreciated that the term "stripping gas" is used herein as a term of convenience to refer to a gas generally capable of performing the functions described herein. The stripping gas 220 flowing through the stripping gas flowpath/circulation gas flowpath 206 may be an actual stripping gas functioning to strip oxygen from the fuel within the contactor, or alternatively may be a sparging gas bubbled through a liquid fuel to reduce an oxygen content of such fuel. For example, as will be discussed in greater detail below, the stripping gas 220 may be an inert gas, such as Nitrogen or Carbon Dioxide ($CO_2$), an inert gas mixture, or some other gas or gas mixture having a relatively low oxygen content.

Moreover, for the exemplary oxygen conversion unit depicted in FIG. 2, the fuel oxygen conversion unit 200 further includes a gas boost pump 208, a gas oxygen reduction unit (which for the embodiment shown is a catalyst 210), and a pre-heater 212. For the embodiment shown, the gas boost pump 208, the catalyst 210, and the pre-heater 212 are each arranged within the circulation gas flowpath 206 in series flow. Additionally, the gas boost pump 208 may be configured as a rotary gas pump coupled to, and driven by, a power source (not shown). In certain embodiments, the power source for the gas boost pump 208 may be the same power source for the fuel gas separator 204 (discussed below), or alternatively, may be any other suitable power source. For example, in certain embodiments, the gas boost pump 208 may be coupled to an accessory gearbox 142 (see FIG. 1), a suitable electrical power source, etc.

Referring still to the embodiment of FIG. 2, it will be appreciated that the fuel gas separator 204 generally defines a gas outlet 214, a liquid fuel outlet 216, and an inlet 218. It will also be appreciated that the exemplary fuel oxygen conversion unit 200 depicted is operable with a fuel delivery system 146, such as a fuel delivery system 146 of the gas turbine engine including the fuel oxygen conversion unit 200 (see, e.g., FIG. 1). The exemplary fuel delivery system 146 generally includes a plurality of fuel lines, and in particular, an inlet fuel line 222 and an outlet fuel line 224. The inlet fuel line 222 is fluidly connected to the contactor 202 for providing a flow of liquid fuel 226 to the contactor 202 (e.g., from a fuel source, such as a fuel tank) and the outlet fuel line 224 is fluidly connected to the liquid fuel outlet 216 of the fuel gas separator 204 for receiving a flow of deoxygenated liquid fuel 226.

Moreover, during typical operations, a flow of stripping gas 220 flows through the circulation gas flowpath 206 from the gas outlet 214 of the fuel gas separator 204 to the contactor 202. More specifically, during typical operations, stripping gas 220 flows from the gas outlet 214 of the fuel gas separator 204, through the pre-heater 212 (configured to add heat energy to the gas flowing therethrough), through the catalyst 210, and to/through the gas boost pump 208, wherein a pressure of the stripping gas 220 is increased to provide for the flow of the stripping gas 220 through the circulation gas flowpath 206. The relatively high pressure stripping gas 220 (i.e., relative to a pressure upstream of the boost pump 208 and the fuel entering the contactor 202) is then provided to the contactor 202, wherein the stripping gas 220 is mixed with the flow of liquid fuel 226 from the inlet fuel line 222 to generate a fuel gas mixture 228. The fuel gas mixture 228 generated within the contactor 202 is provided to the inlet 218 of the fuel gas separator 204. Within the fuel gas separator 204 the fuel gas mixture 228 may be separated back into the flow of liquid fuel 226 and the flow of stripping gas 220. Such operation of the fuel gas separator 204 will be described in greater detail below, e.g., with reference to, e.g., FIG. 3.

Generally, it will be appreciated that during operation of the fuel oxygen conversion unit 200, the liquid fuel 226 provided through the inlet fuel line 222 to the contactor 202 may have a relatively high oxygen content. The stripping gas 220 provided to the contactor 202 may have a relatively low oxygen content or other specific chemical structure. Within the contactor 202, the liquid fuel 226 is mixed with the stripping gas 220, resulting in the fuel gas mixture 228. As a result of such mixing a physical exchange may occur whereby at least a portion of the oxygen within the fuel 226 is transferred to the stripping gas 220, such that the fuel component of the mixture 228 has a relatively low oxygen content (as compared to the fuel 226 provided through inlet fuel line 222) and the stripping gas component of the mixture 228 has a relatively high oxygen content (as compared to the stripping gas 220 provided through the circulation gas flowpath 206 to the contactor 202). The fuel gas separator 204 separates the relatively high oxygen content stripping gas 220 from the relatively low oxygen content fuel 226, again as will be described in greater detail below with reference to FIG. 3.

Further, it will be appreciated that the liquid fuel 226 provided to the liquid fuel outlet 216, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the fuel 226 provided to the liquid fuel outlet 216 may have an oxygen content of less than about five (5) parts per million ("ppm"), such as less than about three (3) ppm, such as less than about two (2) ppm, such as less than about one (1) ppm, such as less than about 0.5 ppm.

Moreover, as will be appreciated, the exemplary fuel oxygen conversion unit 200 depicted recirculates and reuses the stripping gas 220 (i.e., the stripping gas 220 operates in a substantially closed loop). However, the stripping gas 220 exiting the fuel gas separator 204, having interacted with the liquid fuel 226, may have a relatively high oxygen content. Accordingly, in order to reuse the stripping gas 220, an oxygen content of the stripping gas 220 from the outlet 214 of the fuel gas separator 204 may need to be reduced. For the embodiment depicted, and as noted above, the stripping gas 220 flows through the pre-heater 212, through the catalyst 210 where the oxygen content of the stripping gas 220 is reduced, and through the gas boost pump 208. Within the catalyst 210, the relatively oxygen-rich stripping gas 220 is reacted to reduce the oxygen content thereof. It will be appreciated that catalyst 210 may be configured in any suitable manner to perform such functions (i.e., removal of oxygen from the recirculating stripping gas 232). For example, in certain embodiments, the catalyst 210 may be configured to enable the reaction of oxygen and fuel vapor present in the oxygen-rich stripping gas 220 to reduce the overall level of free oxygen in the stripping gas 220. However, in other embodiments, the catalyst 210 may additionally, or alternatively, include geometries of catalytic components through which the relatively oxygen-rich stripping gas 220 flows to reduce an oxygen content thereof. In one or more of these configurations, a byproduct may be produced, such as water, which may be ducted away from the catalyst 210 (duct not depicted in the embodiment of FIG. 2).

Notably, however, in other embodiments any other suitable gas oxygen reduction unit may be provided for reducing an oxygen content of the stripping gas 232. For example, in addition to, or in the alternative, the gas oxygen reduction unit may utilize a membrane oxygen reduction system, a combustion reduction system, a plasma reduction system, etc.

In one or more of these embodiments, the gas oxygen reduction unit/catalyst 210 may be configured to reduce an oxygen content of the stripping gas 220 to less than about five percent (5%) oxygen (O2) by mass, such less than about two percent (2%) oxygen (O2) by mass, such less than about one percent (1%) oxygen (O2) by mass.

The resulting relatively low oxygen content gas is then provided through the remainder of the circulation gas flowpath 206 and back to the contactor 202, such that the cycle may be repeated. In such a manner, it will be appreciated that the stripping gas 220 may be any suitable gas capable of undergoing the chemical transitions described above. For example, the stripping gas may be deoxygenated air from, e.g., a core air flowpath of a gas turbine engine including the fuel oxygen conversion unit 200 (e.g., compressed air bled from an HP compressor 112; see FIG. 1). However, in other embodiments, the stripping gas may instead be any other suitable gas, such as an inert gas, such as Nitrogen or Carbon Dioxide (CO2), an inert gas mixture, or some other gas or gas mixture having a relatively low oxygen content.

It will be appreciated, however, that the exemplary fuel oxygen conversion unit 200 described above is provided by way of example only. In other embodiments, the fuel oxygen conversion unit 200 may be configured in any other suitable manner. For example, in other embodiments, the stripping gas 220 may not flow through a circulation gas flowpath 206, and instead the fuel oxygen conversion unit 200 may include an open loop stripping gas flowpath, with such flowpath in flow communication with a suitable stripping gas source, such as a bleed air source, and configured to dump such air, e.g., to the atmosphere downstream of the fuel gas separator 204.

Figure 3:
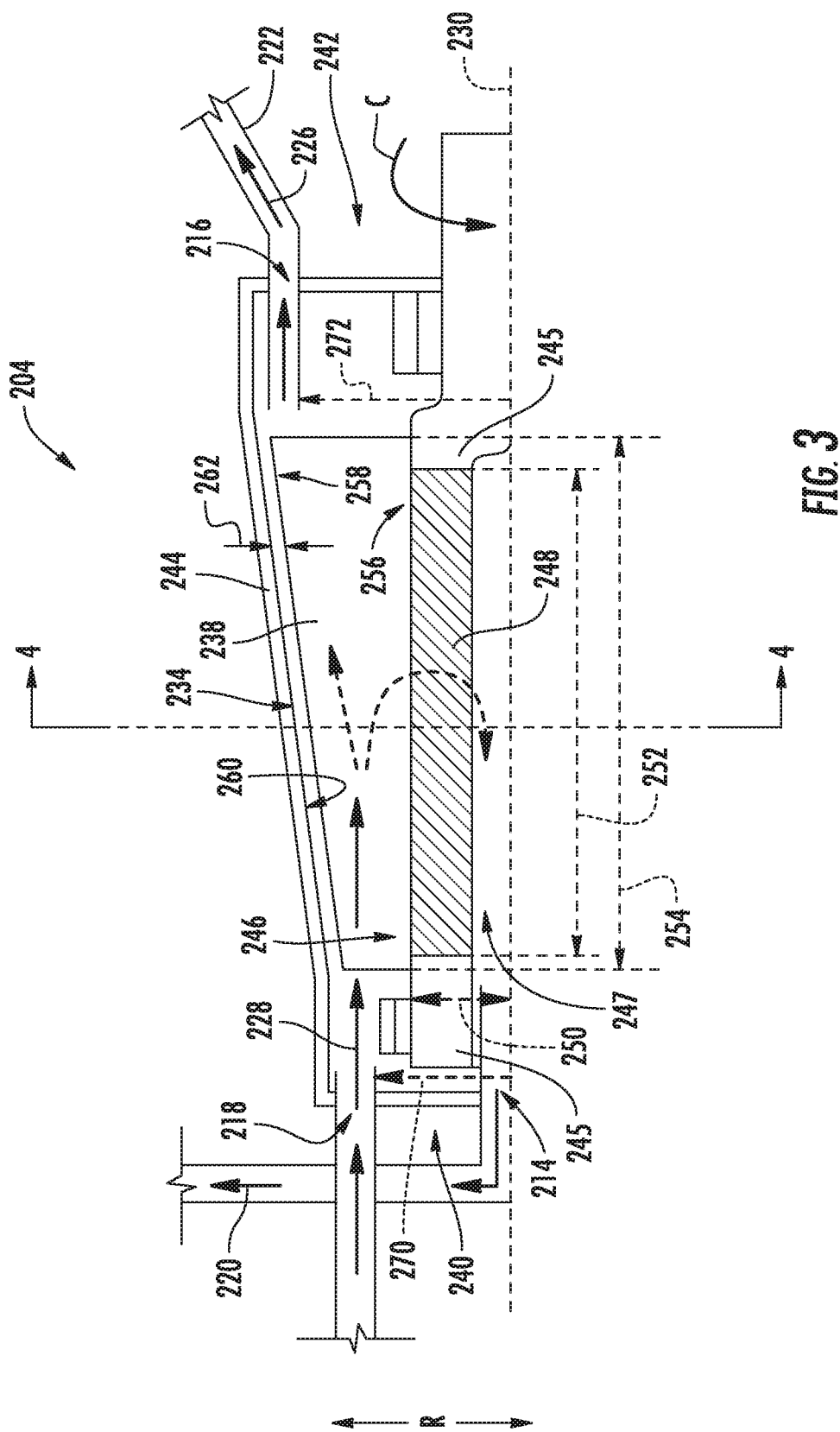
FIG. 3 is a close-up, schematic, cross-sectional view of a fuel gas separator in accordance with an exemplary embodiment of the present disclosure.

Referring now to FIG. 3, operation of the exemplary fuel gas separator 204 described above with respect to the FIG. 2 will be provided. Specifically, FIG. 3 provides a close-up, schematic, cross-sectional view of a section of the exemplary fuel gas separator 204 of FIG. 2.

For the embodiment shown, the fuel gas separator 204 defines a central axis 230, radial direction R, and a circumferential direction C extending about the central axis 230. Additionally, the fuel gas separator 204 is configured as a mechanically-driven fuel gas separator, or more specifically as a rotary/centrifugal fuel gas separator. Further, for the embodiment shown, the fuel gas separator 204 extends generally between a first end 240 and a second end 242 generally along the central axis 230. For the embodiment shown, the fuel gas mixture inlet 218 is positioned proximate the first end 240 and the liquid fuel outlet 216 is positioned proximate the second end 242. Further for the embodiment shown, the stripping gas outlet 214 is also positioned proximate the first end 240. However, in other embodiments the gas outlet 214 may be positioned at any other suitable location.

Referring still to the embodiment of FIG. 3, the fuel gas separator 204 includes a stationary casing 244, an input shaft 232, and a single-stage separator/pump assembly 234. The input shaft 232 is mechanically coupled to the single-stage separator/pump assembly 234, and the two components are together rotatable about the central axis 230 within the stationary casing 244 to separate the fuel gas mixture 228 received through the fuel gas mixture inlet 218 back into the flow of liquid fuel 226 and the flow of stripping gas 220. Further, the input shaft 232 may be mechanically coupled to, and driven by, a suitable power source, such as an accessory gearbox (such as the exemplary accessory gearbox 142 of FIG. 1). However, in other embodiments, the input shaft 232 may be mechanically coupled to any other suitable power source, such as an electric motor.

As will be appreciated, the single-stage separator/pump assembly 234 may simultaneously separate the mixture 228 back into the flows of stripping gas 220 and liquid fuel 226 and increase a pressure of the separated liquid fuel 226 (as will be discussed in greater detail below).

More specifically, for the embodiment depicted, the separator/pump assembly 234 includes a core 246 extending along the central axis 230 of the fuel gas separator 204. The core 246 of the separator/pump assembly 234 further includes forward and aft shaft sections 245 and a gas permeable boundary 248 extending along the central axis 230 of the fuel gas separator 204 between the forward and aft shaft section 245. In addition, the forward and aft shaft section 245 and gas permeable boundary 248 together define a hollow passage 247 extending along the central axis 230 inward of at least a portion of the forward and aft shaft sections 245 and gas permeable boundary 248. The gas permeable boundary 248 may be, e.g., a plurality of openings, or alternatively may be a fluid deterrent structure configured to block substantially all of a liquid flow therethrough.

It will also be appreciated that for the embodiment shown, the gas permeable boundary 248 of the core 246 of the separator/pump assembly 234 is generally configured as a cylindrical gas permeable boundary 248. In such a manner, it will be appreciated that the gas permeable boundary 248 of the core 246 of the separator/pump assembly 234 defines a filter radius 250 along the radial direction R and a filter length 252 along the central axis 230. For the exemplary embodiment depicted, the filter radius 250 of the separator/pump assembly 234 is substantially constant substantially along the filter length 252 of the gas permeable boundary 248. However, in other embodiments, any other suitable structure may be provided for the core 246. For example, in other embodiments, the core 246 may not include the filter described herein, and instead may include any other suitable gas permeable structure. Additionally, in other embodiments, the core 246 and/or boundary 248 may include any other suitable type of filter, shape of filter, or form of filter.

Referring still to FIG. 3, the exemplary single-stage separator/pump assembly 234 depicted further includes a plurality of paddles 238 extending from the core 246. Each of the plurality of paddles 238 extends along the central axis 230, defining a paddle length 254. For the embodiment shown, the paddle length 254 is substantially equal to the filter length 252 of the gas permeable boundary 248 of the core 246, and more specifically, for the embodiment shown, the paddle length 254 is greater than the filter length 252 of the gas permeable boundary 248 of the core 246. However, in other embodiments, the paddle length 254 may be less than the filter length 252 of the gas permeable boundary 248 of the core 246.

Further, each of the plurality of paddles 238 additionally extends outwardly generally along the radial direction R (as will be described in greater detail below) between a paddle base 256 coupled to the core 246 (e.g., attached to one or both of the forward and aft shaft sections 245 and/or the gas permeable boundary 248) and an outer paddle tip 258. Further it will be appreciated that the stationary casing 244 defines an inner surface 260, and the outer paddle tip 258 of each paddle 238 of the single-stage separator/pump assembly 234 defines a clearance 262 along the radial direction R with the inner surface 260 of the stationary casing 244. For the embodiment shown, the clearance 262 of each paddle 238 is substantially constant along its respective paddle length 254.

Figure 4:
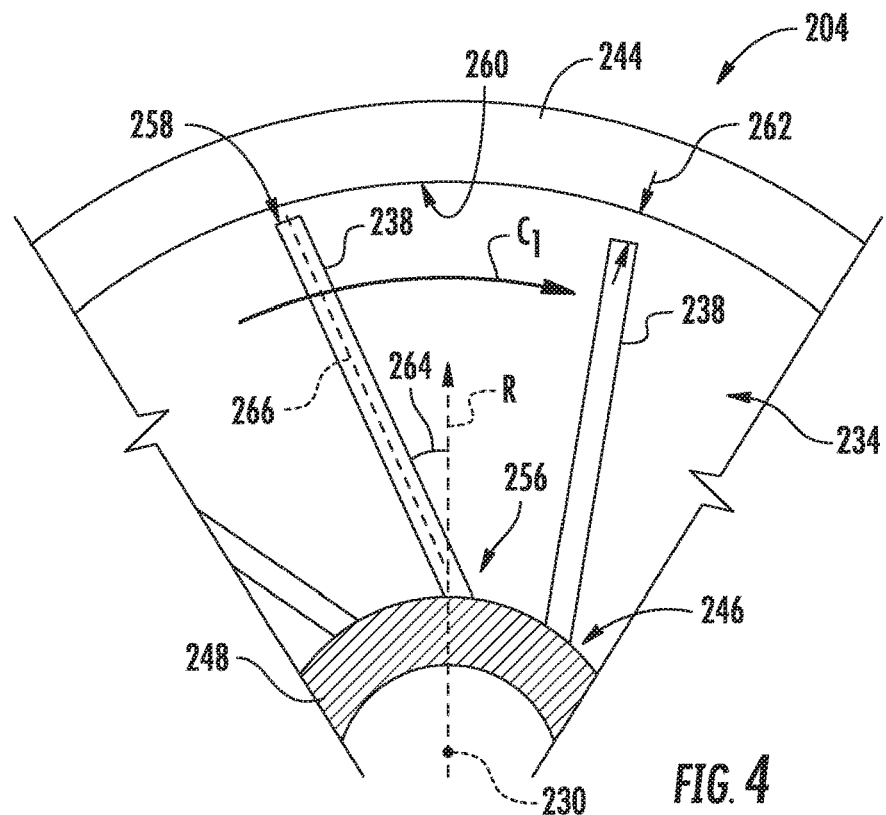
FIG. 4 is an axial, cross-sectional view of the exemplary fuel gas separator of FIG. 3.

Referring now briefly to FIG. 4, a cross-sectional view of the fuel gas separator 204 of FIG. 3, along Line 4-4 of FIG. 3, is provided. As noted above, the plurality of paddles 238 extend outward from the core 246 generally along the radial direction R, and are spaced apart from one another generally along the circumferential direction (a first circumferential direction C1, described below, is depicted in FIG. 4). However, it will be appreciated that for the embodiment of FIG. 4, the plurality of paddles 238 do not extend exactly along the radial direction R. Instead, the plurality of paddles 238 defines a sweep angle 264 relative to the radial direction R. Notably, it will be appreciated that during operation of the fuel gas separator 204, the separator/pump assembly 234 is configured to rotate about the central axis 230 in the first circumferential direction C1. For the embodiment shown, each of the plurality of paddles 238, while extending in a substantially linear direction, slopes away from the core 246 generally along the radial direction R and in a direction opposite the first circumferential direction C1, therefore defining the sweep angle 264.

More specifically, for the embodiment depicted, the sweep angle 264 of the plurality of paddles 238 refers to an angle of a reference line 266 extending between a circumferential midpoint of the paddle 238 at its base 256 and a circumferential midpoint of the paddle 238 at its tip 258. Further, as will be appreciated for the embodiment of FIG. 4, the sweep angle 264 is greater than zero (0). More specifically, for the embodiment shown, the sweep angle 264 is greater than about ten (10) degrees and less than about forty-five (45) degrees, such as greater than about fifteen (15) degrees and less than about thirty (30) degrees. However, in other embodiments any other suitable sweep angle may be provided.

In such a manner, it will be appreciated that the plurality paddles 238 of the separator/pump assembly 234 of the fuel gas separator 204 may effectively push relatively heavy liquid fuel 226 generally outwardly along the radial direction R during operation, while allowing for relatively light stripping gas 220 to flow radially inward to and through the core 246, or rather the boundary 248 of the core 246. Such operations will be discussed in greater detail below.

Notably, however, in other embodiments, the paddles 238 may have any other suitable size, shape, or configuration.

Figure 5:
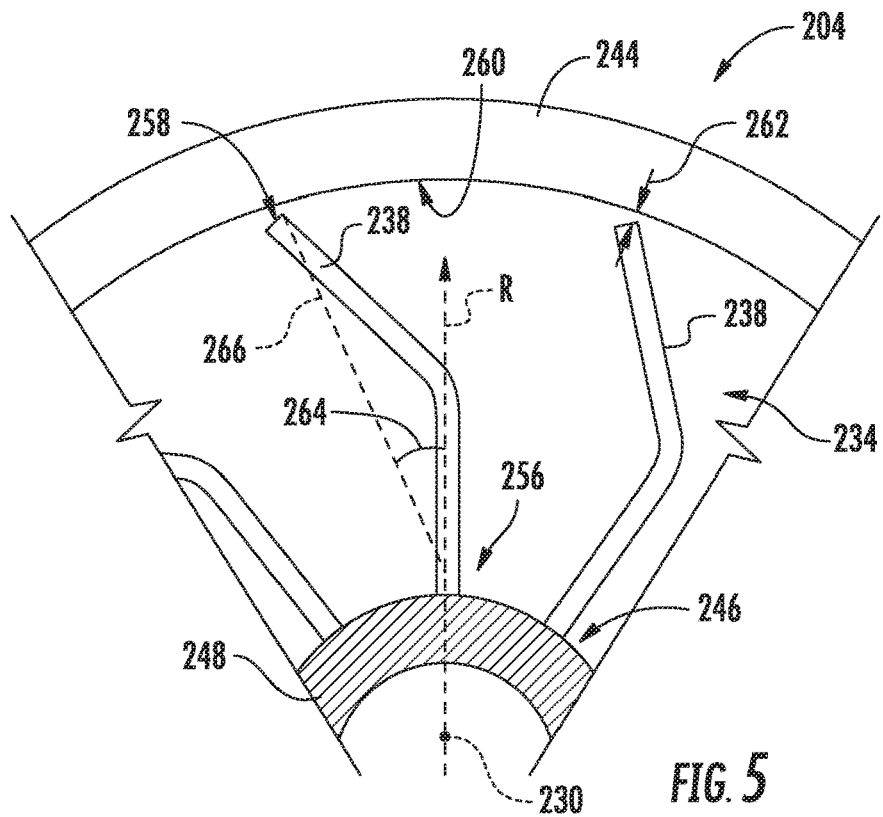
FIG. 5 is an axial, cross-sectional view of a fuel gas separator in accordance with another exemplary embodiment of the present disclosure.

For example, referring briefly to FIG. 5, a cross-sectional view of a fuel gas separator 204 in accordance with another exemplary embodiment of the present disclosure, along a central axis 230 of the fuel gas separator 204, is provided. The exemplary fuel gas separator 204 of FIG. 5 may be configured in the same manner as the exemplary fuel gas separator 204 described above with reference to FIG. 4. Accordingly, the same or similar numbers may refer to same or similar part.

For example, the exemplary fuel gas separator 204 of FIG. 5 generally includes a core 246 and a plurality of paddles 238 extending outwardly from the core 246. However, for the embodiment depicted, the plurality paddles 238 do not extend linearly between a base 256 and a tip 258. Instead, the plurality paddles 238 define a bent shape. The bent shape of the plurality paddles 238 defines an increasing local sweep angle towards its radially outer end as compared to its radially inner end. Regardless, each of the plurality of curved shape paddles 238 defines a reference line 266 extending between a circumferential midpoint of the paddle 238 at its base 256 and a circumferential midpoint of the paddle 238 at its tip 258. The sweep angle 264 of the plurality paddles 238 of FIG. 5 is defined relative to this reference line 266, and the sweep angle 264 may be the same or similar as the sweep angle 264 described above with reference to FIG. 4.

Further, still, it will be appreciated that in still other exemplary embodiments, the paddles 238 may have any other suitable shape or configuration. For example, in other embodiments, the plurality paddles 238 may extend in a linear, bent, or curved direction generally along the radial direction R (i.e., defining a sweep angle 264 about equal to 0). Alternatively, the paddles 238 may define a negative sweep angle (i.e. slope in the first circumferential direction C1).

Referring now back to FIG. 3, it will be appreciated that during operation, a rotation of the single-stage separator/pump assembly 234 about the central axis 230, and more specifically, a rotation of the plurality of paddles 238 about the central axis 230 (i.e., in the circumferential direction C), may generally force heavier liquid fuel 226 outward along the radial direction R and lighter stripping gas 220 inward along the radial direction R through the inner gas boundary 248. In such a manner, the liquid fuel 226 may exit through the liquid fuel outlet 216 of the fuel gas separator 204, and the stripping gas 220 may flow through the hollow passage 247 through the core 246 and exit through the gas outlet 214 of the fuel gas separator 204, as is indicated.

As will also be appreciated for the embodiment of FIG. 3, the inner surface 260 of the stationary casing 244 of the fuel gas separator 204 diverges away from the central axis 230 towards the second end 242 of the fuel gas separator 204. Specifically, for the embodiment depicted, the inner surface 260 of the stationary casing 244 of the fuel gas separator 204 defines a radius 274 and has a substantially frustoconical shape, with the radius 274 being larger at locations closer to the second end 242 as compared to locations closer to the first end 240.

In such a manner, it will further be appreciated that the fuel gas mixture inlet 218 of the fuel gas separator 204 defines an inlet radius 270 along the radial direction R relative to the central axis 230 and the liquid fuel outlet 216 of the fuel gas separator 204 defines an outlet radius 272 along the radial direction R relative to the axis 230. For the embodiment depicted, given that diverging shape of the inner surface 260 of the stationary casing 244, the outlet radius 272 is greater than the inlet radius 270, such as at least about ten percent (10%) greater, such as at least about twenty percent (20%) greater, such as up to an infinite percentage greater (e.g., if the inlet radius 270 were equal to zero).

A fuel gas separator 204 in accordance with the above exemplary embodiments may further provide for a pressurized flow of liquid fuel 226. More specifically, with such an exemplary fuel gas separator 204, the liquid fuel 226 exiting the fuel gas separator 204 through the liquid fuel outlet 216 may be at a higher pressure than the liquid fuel 226 provided through inlet fuel line 222, and further higher than a pressure of the fuel/gas mixture 228 provided through the inlet 218. Such may be due at least in part to the centrifugal force exerted on such liquid fuel 226, facilitated by the rotation of the plurality of paddles 238 and the positioning of the fuel gas mixture inlet 218 and the liquid fuel outlet 216.

For example, it will be appreciated that with such an exemplary embodiment, the fuel gas separator 204 of the fuel oxygen conversion unit 200 may generate a pressure rise in the fuel flow during operation. As used herein, the term "pressure rise" refers to a net pressure differential between a pressure of the flow of liquid fuel 226 provided to the liquid fuel outlet 216 of the fuel gas separator 204 (i.e., a "liquid fuel outlet pressure") and a pressure of the liquid fuel 226 provided through the inlet fuel line 222 to the contactor 202 (see FIG. 2). In at least certain exemplary embodiments, the pressure rise of the liquid fuel 226 may be at least about sixty (60) pounds per square inch ("psi"), such as at least about ninety (90) psi, such as at least about one hundred (100) psi, such as up to about seven hundred and fifty (750) psi. With such a configuration, it will be appreciated that in at least certain exemplary embodiments of the present disclosure, the liquid fuel outlet pressure may be at least about seventy (70) psi during operation. For example, in at least certain exemplary embodiments, the liquid fuel outlet pressure may be at least about one hundred (100) psi during operation, such as at least about one hundred and twenty-five (125) psi during operation, such as up to about eight hundred (800) psi during operation.

It will be appreciated, however, that in other embodiments of the present disclosure, the fuel gas separator 204 may be configured in any other suitable manner. For example, referring now to FIGS. 6 and 7, two additional exemplary embodiments of a fuel gas separator 204 in accordance with exemplary aspects of the present disclosure are provided. The exemplary fuel gas separators 204 depicted in FIGS. 6 and 7 may be configured in substantially the same manner as the exemplary fuel gas separator 204 described above with reference to FIG. 3, and accordingly, may be incorporated into any suitable fuel oxygen conversion unit 200.

Figure 6:
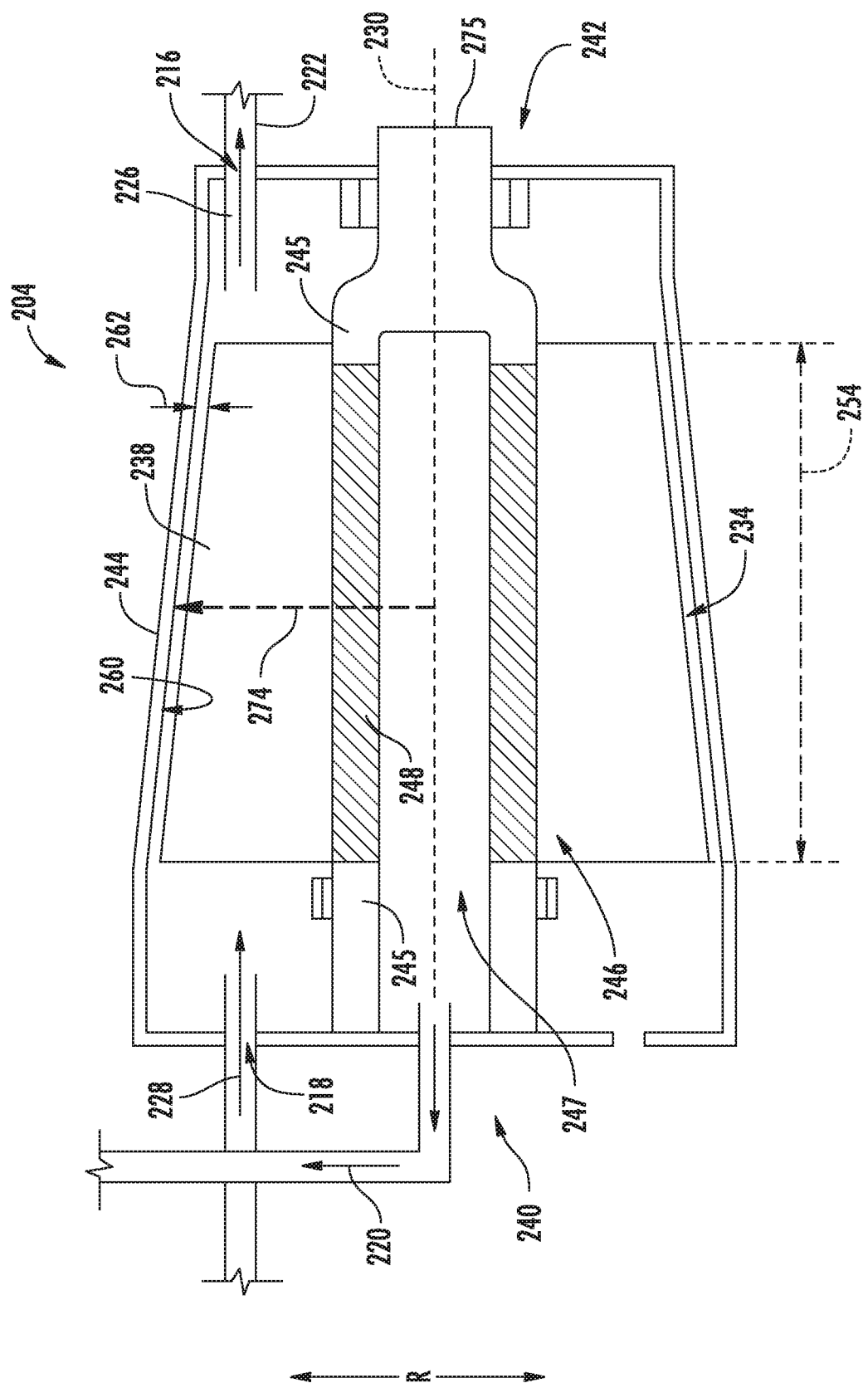
FIG. 6 is a close-up, schematic, cross-sectional view of a fuel gas separator in accordance with still another exemplary embodiment of the present disclosure.
Figure 7:
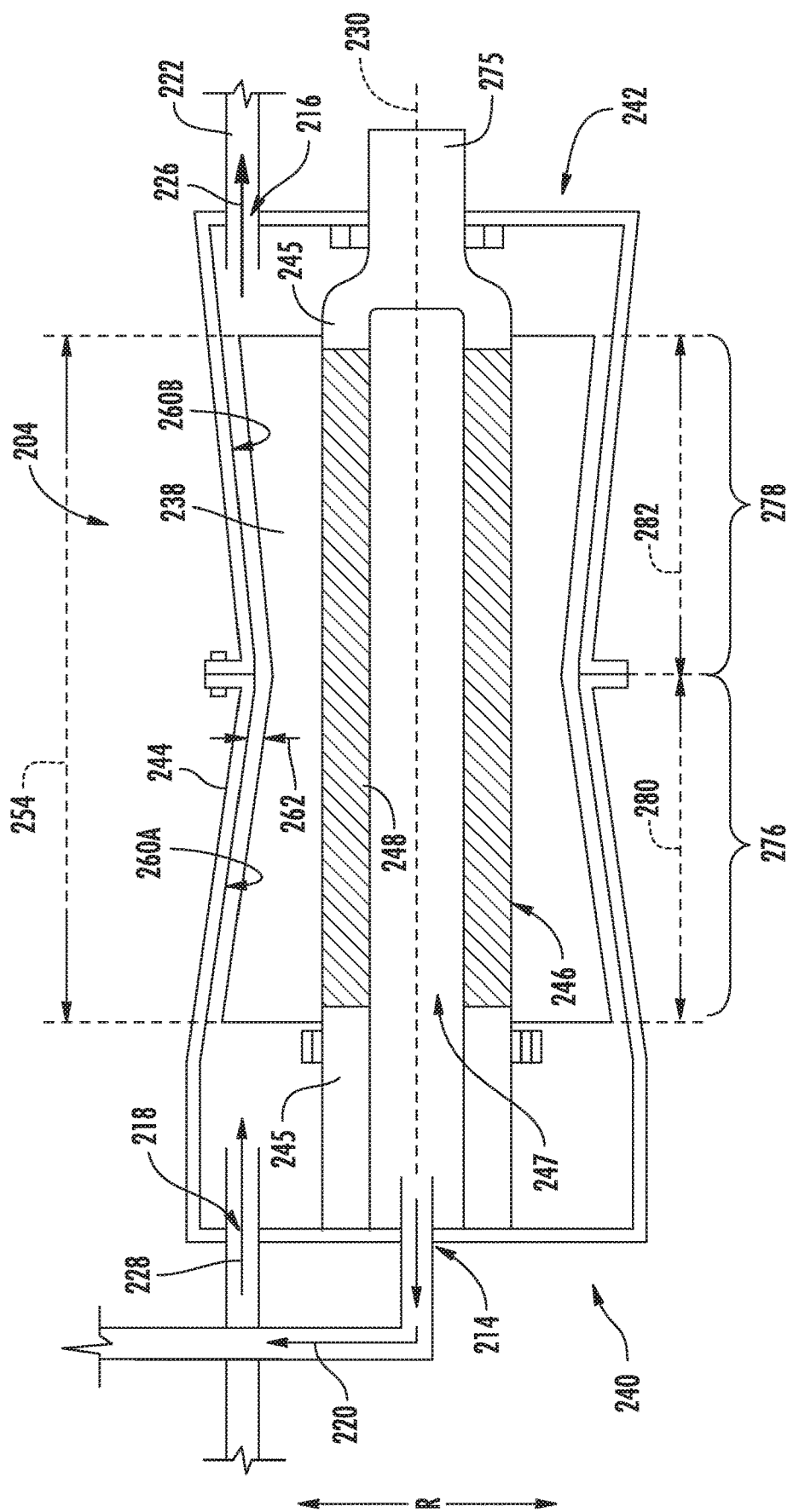
FIG. 7 is a close-up, schematic, cross-sectional view of a fuel gas separator in accordance with yet another exemplary embodiment of the present disclosure.

For example, the exemplary fuel gas separators 204 of FIGS. 6 and 7 each generally define a fuel/gas mixture inlet 218, a stripping gas outlet 214, and a liquid fuel outlet 216. Additionally, each of the exemplary fuel gas separators 204 of FIGS. 6 and 7 generally include a stationary casing 244 and a separation/pump assembly 234 rotatably positioned within the stationary casing 244. The separation/pump assemblies 234 of the exemplary fuel gas separators 204 depicted each generally include an input shaft 275, a core 246, and a plurality of paddles 238 extending from the core 246.

However, for the embodiment of FIGS. 6 and 7, the stationary casing 244 and paddles 238 of the separation/pump assembly 234 of each of the exemplary fuel gas separators 204 is configured in accordance with other embodiments of the present disclosure.

Referring first specifically to FIG. 6, it will be appreciated that the exemplary stationary casing 244 defines an inner surface 260. However, for the embodiment of FIG. 6, the inner surface 260 converges towards the central axis 230 towards a second end 242 of the fuel gas separator 204. In such a manner, it will be appreciated that a radius 274 of the inner surface 260 relative to the central axis 230 decreases as it moves along a central axis 230 from a first end 240 of the fuel gas separator 204 towards the second the fuel gas separator 204. Notably, for the embodiment of FIG. 6, each of the plurality paddles 238 again define a substantially constant clearance 262 along a radial direction R substantially along a length 254 of the paddles 238.

Inclusion of a stationary casing 244 having an inner surface 260 converging in the manner described herein with reference to FIG. 6 may allow for more efficient separation of the fuel gas mixture into the liquid fuel 226 flow and stripping gas 220 flow, by essentially trapping larger bubbles of stripping gas 220 within a fuel gas mixture 228 provided through the fuel gas mixture inlet 218 prior to such bubbles flowing downstream where it may become more difficult to separate such bubbles from the liquid fuel 226 flow.

Referring now specifically to FIG. 7, the exemplary stationary casing 244 again defines an inner surface 260. More specifically, the stationary casing 244 includes a first section 276 and a second section 278, the first section 276 forming a first section of the inner surface 260A, and the second section 278 forming a second section of the inner surface 260B. The first section 276 of the stationary casing 244 is positioned adjacent to the second section 278 of the stationary casing 244 along the central axis 230 of the fuel gas separator 204. Additionally, the first section 276 of the stationary casing 244 is positioned adjacent to the first end 240 of the fuel gas separator 204, and the second section 278 of the stationary casing 244 is positioned adjacent to the second end 242 of the fuel gas separator 204. Moreover, for the embodiment shown, the first section 276 defines a length 280 along the central axis 230 that is substantially equal to a length 282 of the second section 278 along the central axis 230. However, in other exemplary embodiments, the length 280 of the first section 276 may be larger than the length 282 of the second section 278, or alternatively, the length 282 of the second section 278 may be larger than the length 280 of the first section 276.

Further, similar to the exemplary embodiment of FIG. 6, the first section of the inner surface 260A of the stationary casing 244 converges towards the axis 230 towards the second end 242 of the fuel gas separator 204, and similar to the embodiment of FIG. 3, the second section 278 of the inner surface 260B of the stationary casing 244 diverges away from the central axis 230 towards the second end 242 of the fuel gas separator 204. In such a manner, the fuel gas separator 204 may achieve the benefit of including the converging section of the stationary casing 244, while still including the benefits of the diverging section of the stationary casing 244 (e.g., increasing pressure).

Briefly, it will also be appreciated that for the exemplary embodiment depicted, the paddles 238 of the separation assembly again define a clearance 262 with the first section of the inner surface 260A of the stationary casing 244 and with the second section of the inner surface 260B of the stationary casing 244. For the embodiment depicted, the clearance 262 of each of the plurality paddles 238 is substantially constant along the central axis 230 substantially along a length 254 of the paddles 238. Additionally, for the embodiment shown, each of the paddles 238 is configured as a continuous, single piece paddle 238 extending from a location within the first section of the inner surface 260A of the stationary casing 244, along the axis 230, to a location within the second section of the inner surface 260B of the stationary casing 244. However, in other embodiments, any other suitable pattern or design may be provided, such as a two-piece paddle design, a three-piece paddle design, etc. Such a configuration may result in a more efficient separator/pump assembly 234, and more specifically, a more efficient fuel gas separator 204.

Notably, as used herein, the term "converging," with reference to an inner surface 260 of a casing 244, refers to an average reference line of the surface 270 defining an angle greater than zero with the central axis 230, such as between about 5 degrees and about 45 degrees, such as between about 10 degrees and about 30 degrees. Similarly, as used herein, the term "diverging," with reference to an inner surface 260 of a casing 244, refers to an average reference line of the surface 270 defining an angle less than zero with the central axis 230, such as between about −5 degrees and about −45 degrees, such as between about −10 degrees and about −30 degrees.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel oxygen conversion unit comprising:
   a contactor defining a liquid fuel inlet, a stripping gas inlet and a fuel/gas mixture outlet; and
   a fuel gas separator that extends between a first end and a second end thereof, and along an axis defined by the fuel gas separator, the fuel gas separator defining a radial direction, a first circumferential direction extending about the axis, and a fuel/gas mixture inlet in flow communication with the fuel/gas mixture outlet of the contactor, the fuel gas separator comprising:
      a stationary casing defining an inner surface that diverges away from the axis towards the second end; and
      a separator assembly including a core and a plurality of paddles extending from the core, each of the plurality of paddles defining a length that extends from a first location that is adjacent to the first end of the fuel gas separator and to a second location that is adjacent to the second end of the fuel gas separator, the separator assembly rotatable in the first circumferential direction about the axis within the stationary casing to separate a fuel/gas mixture received through the fuel/gas mixture inlet into a liquid fuel flow and a stripping gas flow,
      wherein each of the plurality of paddles define a sweep angle relative to the radial direction that is greater than or equal to 0 such that each of the plurality of paddles extend in the radial direction or slope away from the core and in a direction opposite the first circumferential direction,
      wherein the core of the separator assembly includes a gas permeable boundary, the gas permeable boundary defining a filter outer radius and a filter length along the axis,
      wherein the plurality of paddles extend from the filter outer radius.

2. The fuel oxygen conversion unit of claim 1, wherein the core of the separator assembly is a gas permeable core extending along the axis of the fuel gas separator.

3. The fuel oxygen conversion unit of claim 1, wherein the filter outer radius of the gas permeable boundary is substantially constant substantially along the filter length.

4. The fuel oxygen conversion unit of claim 1, wherein the fuel/gas mixture inlet is positioned proximate the first end, wherein a liquid fuel outlet is positioned proximate the second end.

5. The fuel oxygen conversion unit of claim 1, wherein the fuel gas separator further defines a liquid fuel outlet, wherein the fuel/gas mixture inlet of the fuel gas separator defines an inlet radius along the radial direction relative to the axis, wherein the liquid fuel outlet of the fuel gas separator defines an outlet radius along the radial direction relative to the axis, and wherein the outlet radius is greater than the inlet radius.

6. The fuel oxygen conversion unit of claim 1, wherein the plurality of paddles of the separator assembly extend outwardly from the core and are spaced along the first circumferential direction.

7. The fuel oxygen conversion unit of claim 1, wherein the plurality of paddles each define a length along the axis and a clearance with the stationary casing, and wherein the clearance of each of the plurality of paddles is substantially constant along their entire respective lengths.

8. The fuel oxygen conversion unit of claim 1, wherein the sweep angle is greater than 0.

9. The fuel oxygen conversion unit of claim 8, wherein the sweep angle is greater than 10 degrees and less than 45 degrees.

10. The fuel oxygen conversion unit of claim 8, wherein the sweep angle is greater than 15 degrees and less than 30 degrees.

11. The fuel oxygen conversion unit of claim 1, wherein the fuel gas separator defines a stripping gas outlet, wherein the fuel/gas mixture inlet is positioned proximate the first end, and wherein the stripping gas outlet is also positioned proximate the first end such that the stripping gas flow enters and exits the fuel gas separator at the first end.

12. The fuel oxygen conversion unit of claim 1, wherein the inner surface of the stationary casing is a first section of the inner surface of the stationary casing positioned proximate the first end of the fuel gas separator, wherein the stationary casing further defines a second section of the inner surface of the stationary casing positioned proximate the second end of the fuel gas separator, and wherein the second section of the inner surface of the stationary casing diverges away from the axis towards the second end.

13. The fuel oxygen conversion unit of claim 12, wherein each of the plurality of paddles are configured as continuous, single piece paddles extending from a location within the first section of the inner surface of the stationary casing along an axial direction to a location within the second section of the inner surface of the stationary casing.

14. The fuel oxygen conversion unit of claim 1, further comprising:
   a gas oxygen reduction unit, wherein the fuel oxygen conversion unit defines a circulation gas path extending from a stripping gas outlet of the fuel gas separator to the stripping gas inlet of the contactor, and wherein the gas oxygen reduction unit is positioned in flow communication with the circulation gas path.

15. The fuel oxygen conversion unit of claim 14, further comprising:
a gas boost pump positioned in flow communication with the circulation gas path.

16. A gas turbine engine comprising:
a combustion section; and
a fuel delivery system for providing a flow of fuel to the combustion section, the fuel delivery system comprising a fuel oxygen conversion unit, the fuel oxygen conversion unit comprising:
   a contactor defining a liquid fuel inlet, a stripping gas inlet and a fuel/gas mixture outlet; and
   a fuel gas separator that extends between a first end and a second end thereof, and along an axis defined by the fuel gas separator, the fuel gas separator defining a radial direction, a first circumferential direction extending about the axis, and a fuel/gas mixture inlet in flow communication with the fuel/gas mixture outlet of the contactor, the fuel gas separator comprising:
      a stationary casing; and
      a separator assembly including a core and a plurality of paddles extending from the core, each of the plurality of paddles defining a length that extends from a first location that is adjacent to the first end of the fuel gas separator and to a second location that is adjacent to the second end of the fuel gas separator, the separator assembly rotatable in the first circumferential direction about the axis within the stationary casing to separate a fuel/gas mixture received through the fuel/gas mixture inlet into a liquid fuel flow and a stripping gas flow,
      wherein each of the plurality of paddles define a sweep angle relative to the radial direction that is greater than or equal to 0 such that each of the plurality of paddles extend in the radial direction or slope away from the core and in a direction opposite the first circumferential direction,
      wherein the core of the separator assembly includes a gas permeable boundary, the gas permeable boundary defining a filter outer radius and a filter length along the axis,
      wherein the plurality of paddles extend from the filter outer radius.

17. The gas turbine engine of claim 16, wherein the fuel/gas mixture inlet is positioned proximate the first end, wherein a liquid fuel outlet is positioned proximate the second end.

18. The fuel oxygen conversion unit of claim 1, wherein the inner surface of the stationary casing that diverges away from the axis towards the second end defines a radius and has a substantially frustoconical shape, with the radius being larger at locations closer to the second end as compared to locations closer to the first end.

* * * * *